April 28, 1970     R. TYLER     3,508,466
HYDRAULIC MACHINE
Filed June 25, 1968
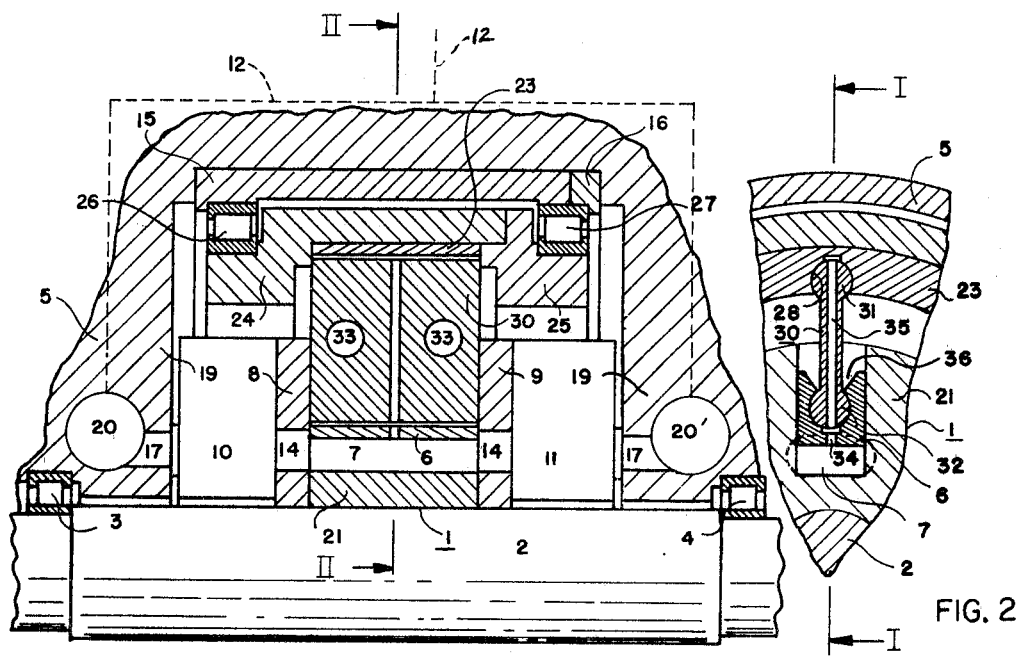
FIG. 1
FIG. 2
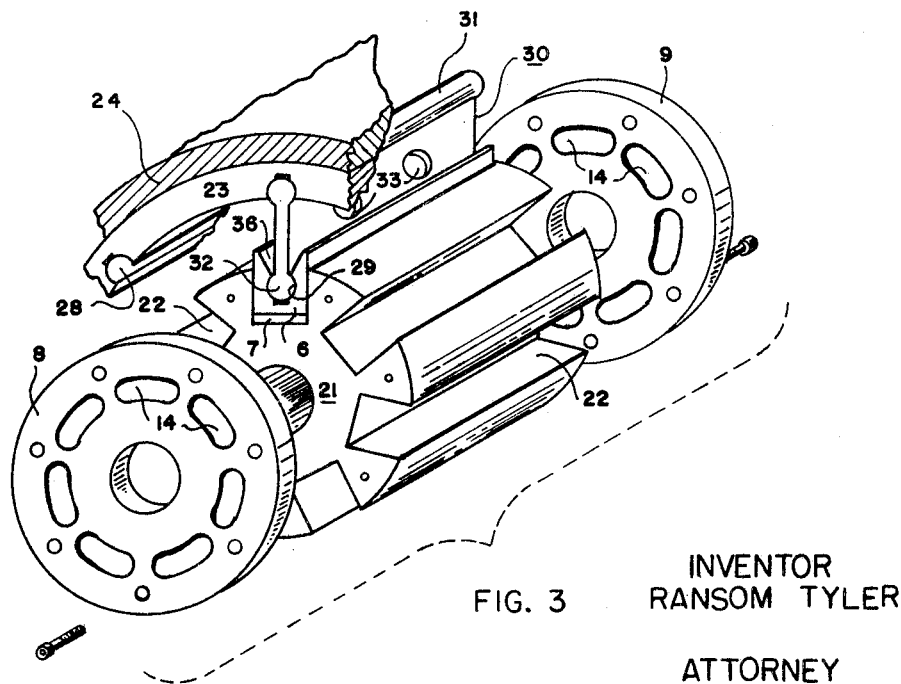
FIG. 3
INVENTOR
RANSOM TYLER
ATTORNEY
T. Lloyd LaFave

United States Patent Office

3,508,466
Patented Apr. 28, 1970

3,508,466
HYDRAULIC MACHINE
Ransom Tyler, Hales Corners, Wis., assignor to The Oilgear Company, Milwaukee, Wis.
Filed June 25, 1968, Ser. No. 739,777
Int. Cl. F01b *13/06;* F02b *57/08*
U.S. Cl. 91—472                             1 Claim

ABSTRACT OF THE DISCLOSURE

A radial piston hydrostatic machine in which the pistons are tied to a reaction ring eccentric to the rotor fluid distributing flat valves are arranged coaxially of the rotor and the rotor is a slotted cylindrical member with end closure plates to close the slots and define piston chambers for rectangular pistons.

---

This invention relates to a radial piston hydrostatic machine operable as a pump and as a motor and particularly relates to a simple construction of rotor and pistons for a relatively large flow capacity with respect to the dimensions of the machine.

In conventional design increased flow capacity for a given operating speed, pressure and stroke is obtained by making the rotor of larger diameter to accommodate round pistons of larger cross-sectional area, or is obtained by making the rotor of longer axial length to accommodate multiple banks of pistons.

It is an object of the present invention to provide a radial piston machine having substantially larger flow capacity for a bank of pistons without substantially increasing the dimensions of the machine.

Another object of the invention is to provide a radial piston machine with a single bank of pistons having a larger cross-sectional area without increasing the diameter of the rotor.

Another object is to provide a rotor construction for such a machine that retains the flow volume capacity although the rotor diameter is made smaller.

Another object of the invention is to provide a radial piston hydrostatic pump or motor with a rotor and reaction ring rotatable together solely by virtue of pistons tied to the reaction ring and all of simplified construction to reduce the number of parts and to effect improved flow capacity.

Another object of the invention is to provide a radial piston hydrostatic machine with rectangularly shaped pistons each with a cross-sectional area at least $4/\pi$ times the cross-sectional area of a round piston whose diameter is equal to the width of the rectangularly shaped piston, and also for the improved flow capacity to provide flow distributing means axially of and at both ends of the rotor.

Another object of the invention is to provide hydrostatic balance for the rotor of such a machine against axial hydraulic forces to reduce the axial forces transmitted to rotor support bearings.

A description of a radial piston hydrostatic pump or motor embodying the invention includes the following drawings, in which:

FIG. 1 is a longitudinal cross-section of a portion of the upper half of a hydraulic pump or motor; taken along the line I—I of FIG. 2;

FIG. 2 is a cross-sectional view of a portion of the machine of FIG. 1 taken along the line II—II; and FIG. 3 is an exploded view of the rotor of FIG. 1 to better illustrate the structure and arrangement of the rotor components including the end plates, pistons and reaction ring.

The radial piston hydrostatic machine comprises a rotor 1 rigidly mounted on a shaft 2 that is rotatably supported in radial and thrust bearings 3, 4, in a housing 5 so that the rotor is radially and axially rigid. The rotor has rectangularly shaped pistons 6 and piston chambers 7, as hereinafter described, radially arranged in the rotor.

Wear plates 8, 9 or end closure plates are mounted on the ends of the rotor for rotation therewith and for cooperation with distributor valves 10, 11 through which the shaft extends, provided by non-rotatable flat valves having a well known arrangement of opposed arcuate high pressure and low pressure ports with which piston chamber ports 14 in the wear plates alternately register upon rotation of the rotor. Ports in the back face of each flat valve are aligned with passages 17 in manifold 19 in the end head portions each containing a pair of manifold passages of which one passage 20 or 20' is shown. These manifold passages 20 and 20' simultaneously communicate with the same piston chamber and are therefore shown interconnected, by dotted lines, to a common machine port or external line 12. Holdup pistons, not shown, are provided in the ports in the back face of the flat valve to make sealing engagement with the manifold 19 and to urge the flat valve axially against the wear plate while maintaining constant communication respectively with the manifold passages. This type of a flat valve is described in U.S. Patents 2,406,138 and 3,238,888.

The two flat valves 10, 11 at opposite ends of the rotor 10 transmit equal and opposite axial hydraulic forces on the rotor and the radial hydraulic forces acting between a reaction ring 23 and the rotor cause substantially radial load on the shaft which is taken up by the shaft support bearings 3, 4.

The rotor 1 comprises a cylindrical member 21 and the end closure plates 8, 9 which serve as the wear plates for the rotor. The cylindrical member 21 is provided with radial slots 22 which extend axially therethrough and with the closure plates define the piston chambers 7 for the machine. The closure plates have axial ports, which align with the bottom portions of the slots 22, respectively, and which upon rotation of the rotor alternately register with the valve ports for conducting fluid to and from the piston chambers.

The rectangular shaped pistons 6 are fitted in the slots 22 for radial movement therein. In contrast to a conventional rotor construction having a bank of a corresponding number of radial cylinder bores and round pistons, each of which has a diameter equal to the width of the rectangular piston and requiring a corresponding rotor diameter and minimum circumferential spacing between piston chambers, each rectangular piston has an axial length greater than its width and thereby provides a cross-sectional area of more than $4/\pi$ times that of a round piston. When the length of the rectangular piston is $\pi$ times its width it has a cross-sectional area equivalent to four round pistons whose diameter is equal to the width of the rectangular piston. Each rectangular piston shown has a length on the order of 3 times its width and therefore provides a working area equivalent to 3.8 round pistons whose diameter is equal to such width.

Displacement of the pistons 6 is effected by an annular reaction ring 23 rotatably supported about an axis of rotation eccentric to the axis of rotation of the rotor. The annular reaction ring is a tubular member disposed within annular back-up members 24, 25 which are rotatably supported in bearings 26, 27 secured in annular members 15, 16 fitted in the frame or housing 5 of the machine and provide convenience of assembly and rigid support for the reaction ring.

The annular reaction ring 23 is provided with keyways 28 open to its inner surface which extend axially through the reaction ring. The keyways are formed by axial holes to define cylindrical sockets for axial insertion of a cylindrical or rod shaped end 31 of a piston connector 30 journalled therein for swinging movement in a radial plane.

Each piston 6 is provided in its radially outer end with similarly formed axially extending keyways 29 which define cylindrical sockets that extend from one end of the piston to the other end for receiving inner rod shaped end 32 of a piston connector. The piston keyway open to a diverging slot 36 to accommodate swinging movement of the piston connector between the rotor and the reaction ring.

Each piston connector 30 is thus a rigid beam link having rod shaped ends 31, 32 journalled in keyways provided by the cylindrical sockets 28, 29 in the reaction ring and in the piston 6 for thrust transmission and positive reciprocation of the piston for both pressure and suction strokes of the piston. The connector 30 or beam link extends axially of the reaction ring and of the piston the length thereof. The mid-portion or web of the connector has large holes 33 therethrough for the free passage of oil about the rotor within the casing upon rotation of the rotor.

In order to provide lubrication for the journal connections for the piston connector or beam-link, over normal wetting obtained from oil in the casing, the piston may be provided with one or more small radial passages 34 to its keyway socket so that high pressure fluid in the piston chamber will be forced into the keyway socket. The beam link may also be provided with one or more small radial passages 35 therethrough to provide passage for lubricating fluid to the end journalled in the reaction ring.

I claim:
1. A radial piston hydrostatic machine comprising a housing, a rotor rotatably supported in said housing, a plurality of radially extending pistons in said rotor, a reaction ring radially and axially rigidly supported for rotation in said housing about an axis eccentric to the axis of said rotor, means tieing said pistons in thrust transmitting relation to said reaction ring, and said machine characterized in that said rotor has a plurality of radial slots extending between the ends of the rotor with said radially extending pistons fitted therein and defining a plurality of expansible chambers therewith and each said piston being rectangularly shaped with an axial length substantially greater than its width, wear plates secured to the ends of the rotor and having a plurality of axial ports which align with the bottom portions of said slots, non-rotatable valve means arranged coaxially of the rotor for abutment with the wear plates whose axial ports alternately register with the valve means upon rotation of the rotor, and said means tieing said pistons to said reaction ring comprising rectangularly shaped beam links each extending the length of said rotor and having transverse openings permitting free movement of fluid between opposite faces of the beam link.

References Cited

UNITED STATES PATENTS

| | | | |
|---|---|---|---|
| 895,643 | 8/1908 | Johnston | 230—177 X |
| 932,033 | 8/1909 | Krone | 91—176 X |
| 2,064,635 | 12/1936 | Stern | 103—161 X |
| 2,374,592 | 4/1945 | Ernst | 103—161 |
| 2,728,302 | 12/1955 | Ferris. | |
| 2,920,611 | 1/1960 | Casini. | |

MARTIN P. SCHWADRON, Primary Examiner

I. C. COHEN, Assistant Examiner

U.S. Cl. X.R.

92—58; 123—44